(12) United States Patent
Hagstrom

(10) Patent No.: US 11,331,927 B2
(45) Date of Patent: May 17, 2022

(54) INK MIST COLLECTION SYSTEM

(71) Applicant: Primera Technology, Inc., Plymouth, MN (US)

(72) Inventor: Erick Hagstrom, Wayzata, MN (US)

(73) Assignee: PRIMERA TECHNOLOGY, INC., Plymouth, MN (US)

( * ) Notice: Subject to any disclaimer, the term of this patent is extended or adjusted under 35 U.S.C. 154(b) by 0 days.

(21) Appl. No.: 17/004,700

(22) Filed: Aug. 27, 2020

(65) Prior Publication Data

US 2021/0060956 A1 Mar. 4, 2021

Related U.S. Application Data

(60) Provisional application No. 62/894,323, filed on Aug. 30, 2019.

(51) Int. Cl.
| | | |
|---|---|---|
| *B41J 2/17* | (2006.01) | |
| *B41J 2/175* | (2006.01) | |
| *A23P 20/18* | (2016.01) | |
| *B41J 3/407* | (2006.01) | |
| *B41J 29/02* | (2006.01) | |

(Continued)

(52) U.S. Cl.
CPC .......... *B41J 2/17563* (2013.01); *A21D 13/24* (2017.01); *A21D 13/80* (2017.01); *A23P 20/18* (2016.08); *A23P 20/20* (2016.08); *B41J 2/1714* (2013.01); *B41J 2/1721* (2013.01); *B41J 3/407* (2013.01); *B41J 3/4073* (2013.01); *B41J 3/40731* (2020.08); *B41J 13/0009* (2013.01); *B41J 29/02* (2013.01); *B41J 29/17* (2013.01);

(Continued)

(58) Field of Classification Search
CPC .. B41J 2/1714; B41J 2/185; B41J 2002/1853; B41J 29/02; B41J 29/13; B41J 3/36; B41J 3/39; B41J 3/4075; B41J 3/407
See application file for complete search history.

(56) References Cited

U.S. PATENT DOCUMENTS

| | | | |
|---|---|---|---|
| 4,800,398 A | * | 1/1989 | Naruse ...................... B41J 2/02 347/49 |
| 4,981,074 A | | 1/1991 | Machita et al. |

(Continued)

FOREIGN PATENT DOCUMENTS

| | | |
|---|---|---|
| CN | 1868754 A | 11/2006 |
| CN | 201325212 Y | 10/2009 |

(Continued)

OTHER PUBLICATIONS

International Search Report issued for PCT/US2020/048406, dated Nov. 26, 2020.

(Continued)

*Primary Examiner* — Scott A Richmond
(74) *Attorney, Agent, or Firm* — Westman, Champlin & Koehler, P.A.; Z. Peter Sawicki; Amanda M. Prose

(57) ABSTRACT

A printer ink mist collection system for a printer and a method of collecting and removing ink mist from the printer, the system having a channel extending from a print area to a filtration system wherein the filtration system comprises one or more filters and wherein the channel is configured to direct airborne ink and mist generated during printing to the filtration system and wherein the channel and filtration system are removable from a printer for purposes of cleaning the ink collection system.

18 Claims, 7 Drawing Sheets

(51) Int. Cl.

| | | |
|---|---|---|
| *A23P 20/20* | (2016.01) | |
| *B41J 13/00* | (2006.01) | |
| *B41M 5/00* | (2006.01) | |
| *A21D 13/80* | (2017.01) | |
| *A21D 13/24* | (2017.01) | |
| *B41J 29/17* | (2006.01) | |
| *A23P 20/25* | (2016.01) | |

(52) U.S. Cl.
CPC ........ *B41M 5/0041* (2013.01); *B41M 5/0047* (2013.01); *A23P 2020/253* (2016.08)

(56) References Cited

U.S. PATENT DOCUMENTS

| | | | |
|---|---|---|---|
| 5,505,775 | A | 4/1996 | Kitos |
| 5,774,141 | A * | 6/1998 | Cooper ................. B41J 2/1714 347/34 |
| 5,795,395 | A | 8/1998 | Ben-Matitayhu et al. |
| 5,988,787 | A | 11/1999 | Watanabe et al. |
| 2004/0114192 | A1 | 6/2004 | Jensen |
| 2006/0119628 | A1 | 6/2006 | Kofman et al. |
| 2009/0021548 | A1* | 1/2009 | Suzuki ................. B41J 2/17566 347/14 |
| 2011/0025735 | A1* | 2/2011 | Nohilly .................... B41J 3/407 347/2 |
| 2012/0141636 | A1 | 6/2012 | Ackley, Jr. et al. |
| 2013/0314721 | A1* | 11/2013 | Colonel ................ B41J 3/4075 358/1.1 |
| 2015/0266309 | A1* | 9/2015 | Nakata .................. B41J 2/1714 347/34 |

FOREIGN PATENT DOCUMENTS

| | | |
|---|---|---|
| CN | 105346266 A | 2/2016 |
| CN | 207128411 U | 3/2018 |
| JP | 5346728 A | 12/1993 |
| JP | 2005327918 A | 11/2005 |
| JP | 2007136729 A | 6/2007 |
| JP | 2013078894 A | 5/2013 |
| KR | 20040027323 A | 4/2004 |
| RU | 2224955 C2 | 2/2004 |
| WO | 1997/027759 A1 | 8/1997 |
| WO | 1999013707 A1 | 3/1999 |
| WO | 2001/029748 A1 | 4/2001 |

OTHER PUBLICATIONS

Written Opinion of the International Searching Authority issued for PCT/US2020/048406, dated Nov. 26, 2020.
International Search Report issued for PCT/US2020/048404, dated Nov. 19, 2020.
Written Opinion of the International Searching Authority issued for PCT/US2020/048404, dated Nov. 19, 2020.
International Search Report issued for PCT/US2020/048407, dated Nov. 19, 2020.
Written Opinion of the International Searching Authority issued for PCT/US2020/048407, dated Nov. 19, 2020.

* cited by examiner

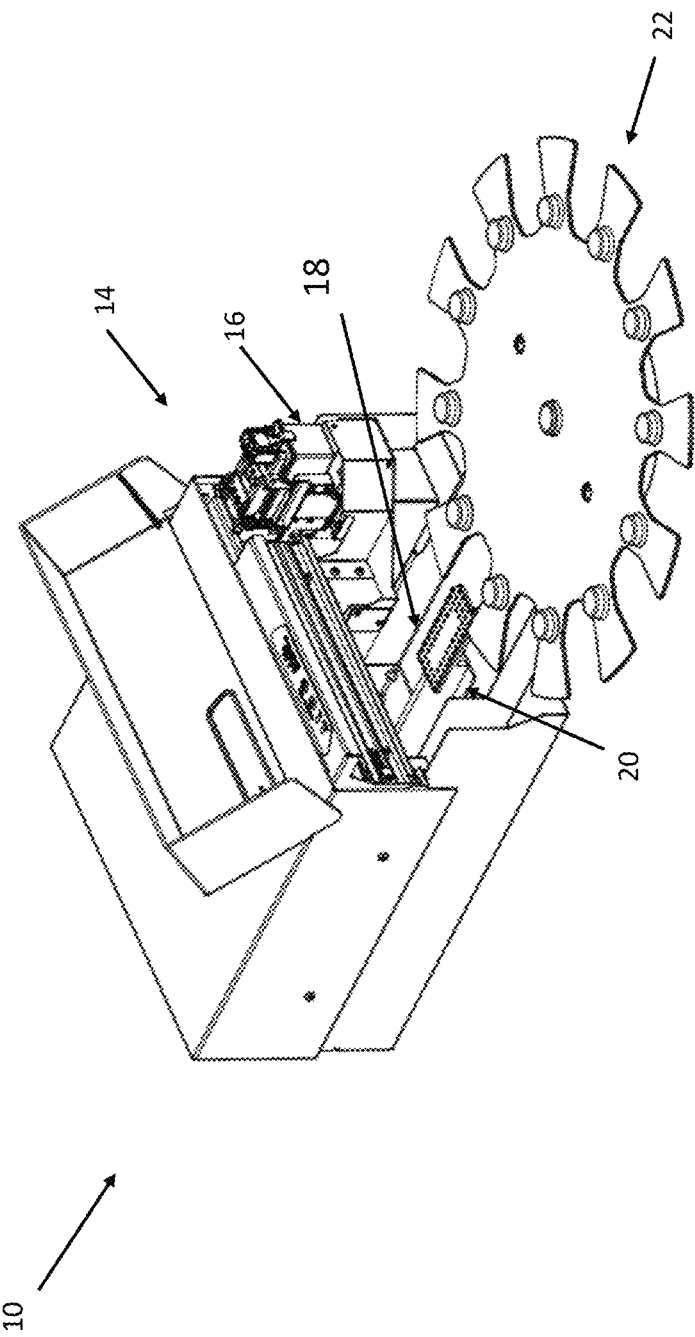

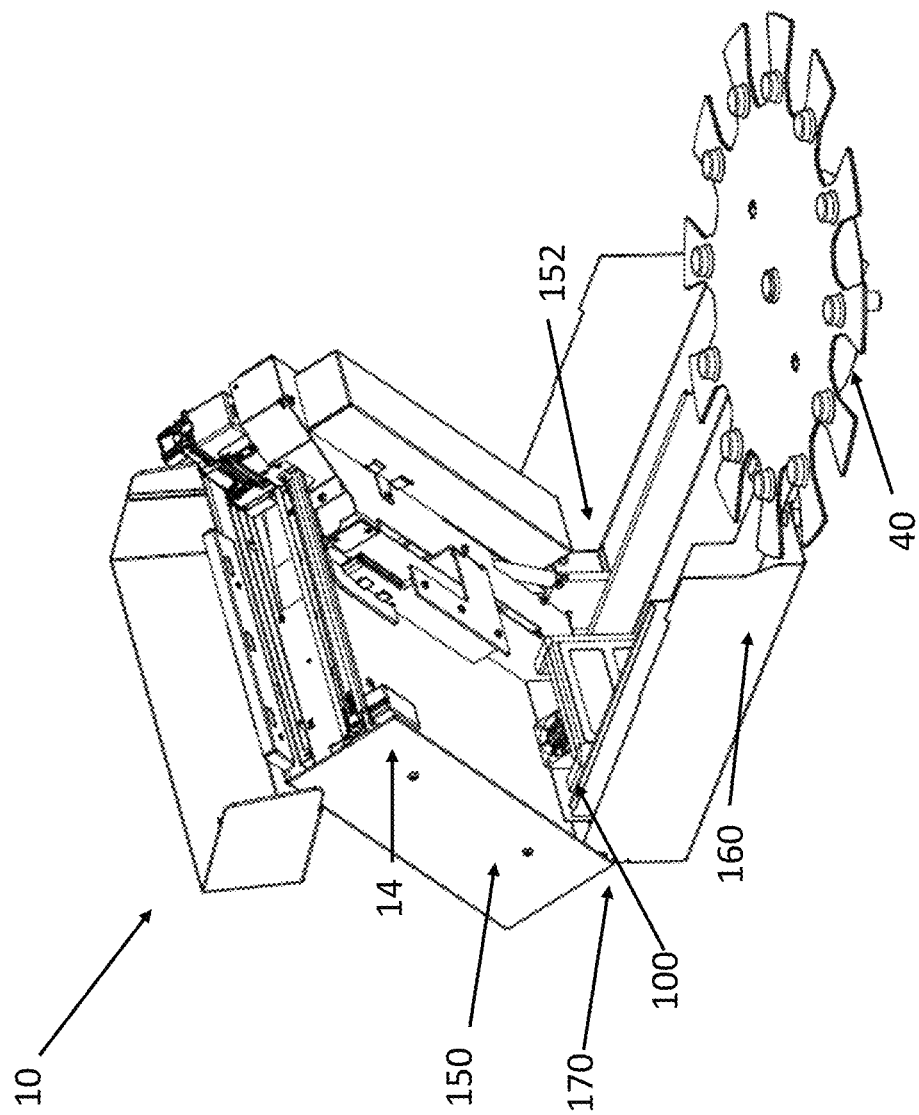

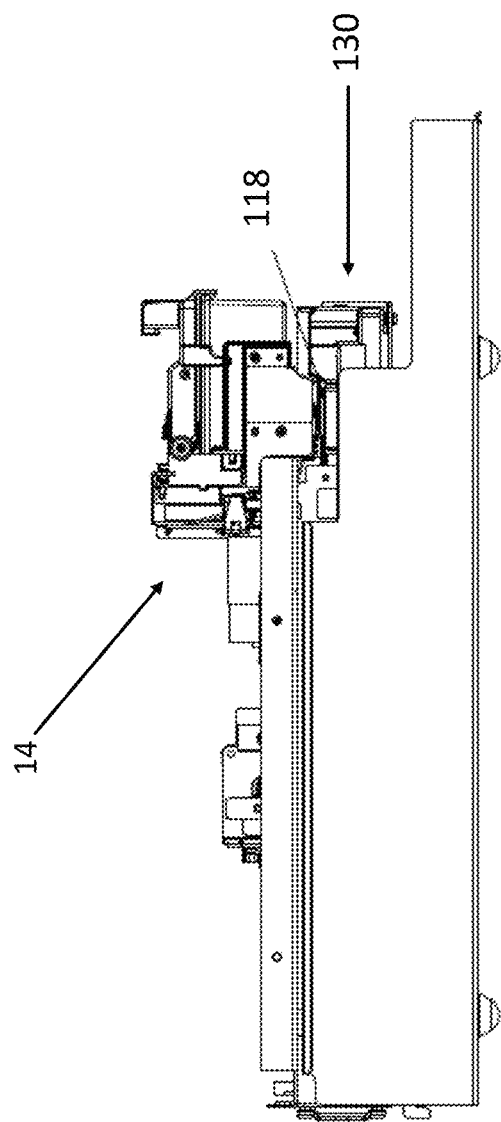

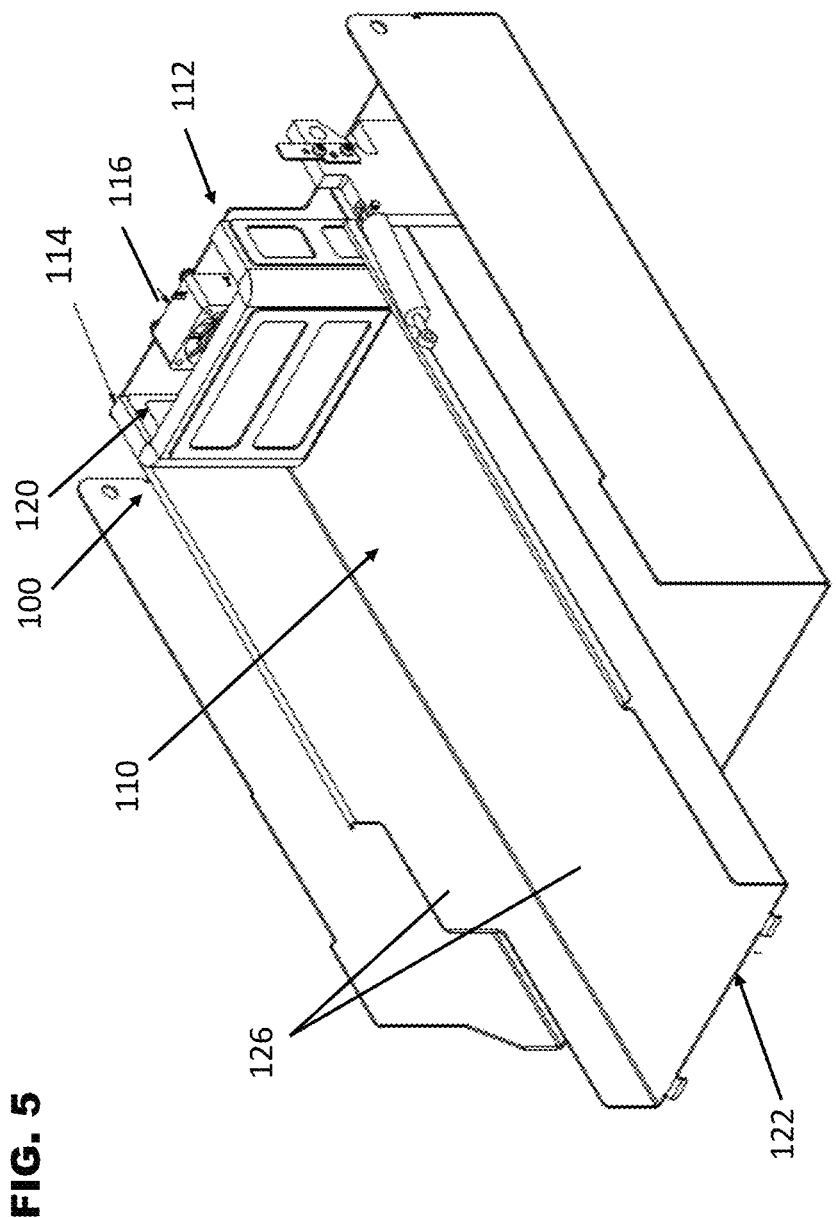

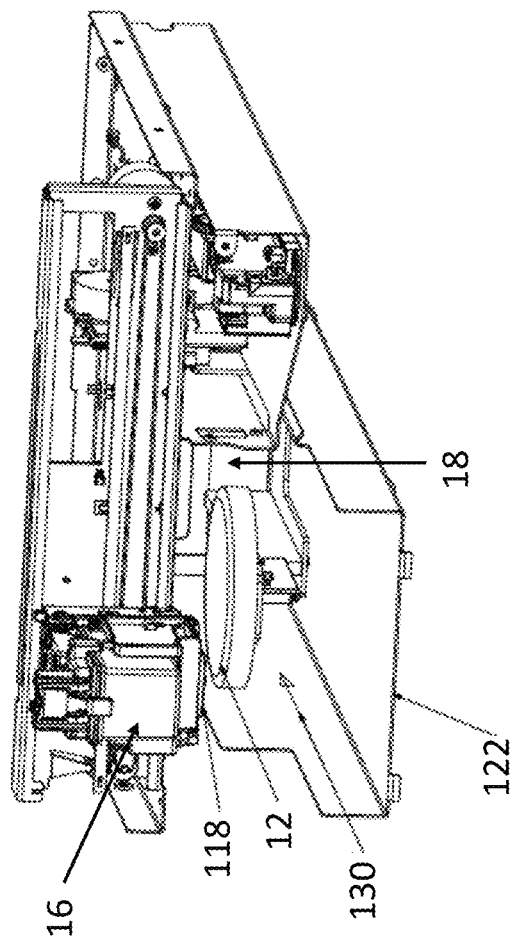

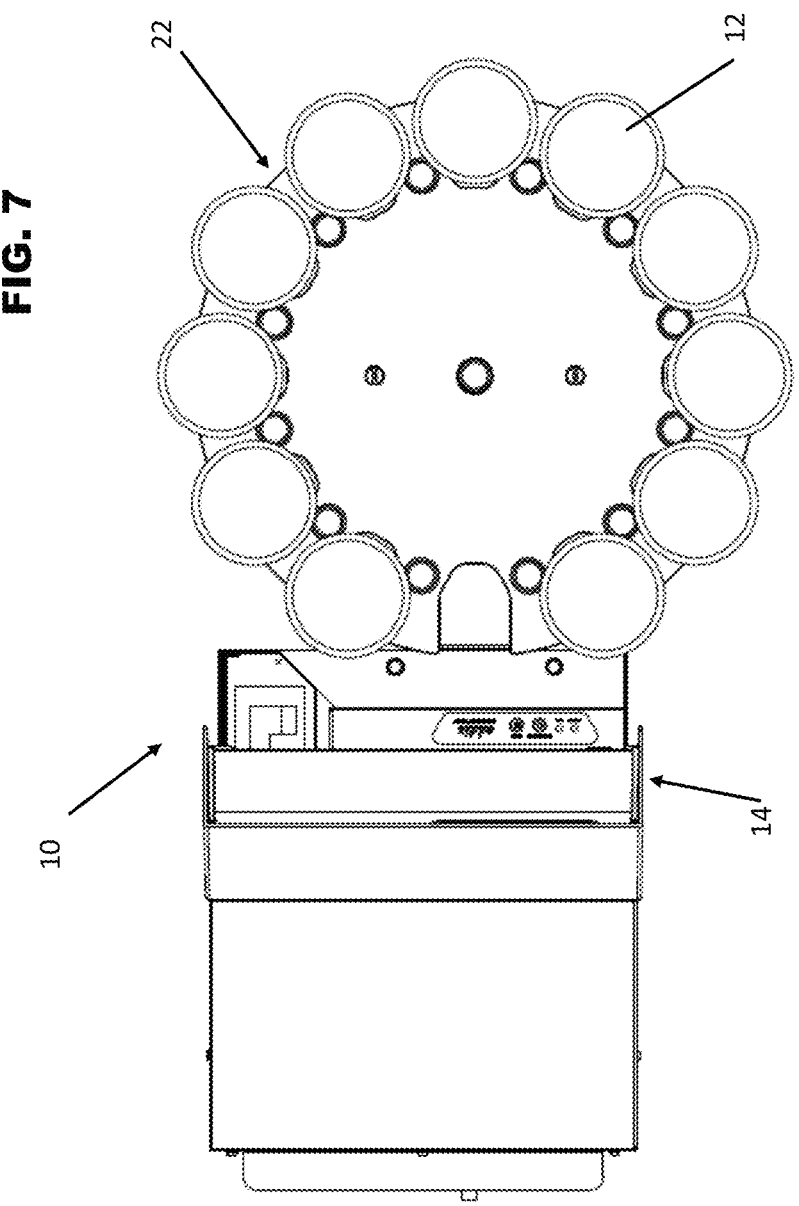

INK MIST COLLECTION SYSTEM

CROSS-REFERENCE TO RELATED APPLICATION

The present application claims priority to and the benefit of U.S. provisional application Ser. No. 62/894,323, filed on Aug. 30, 2019, the contents of which are hereby incorporated in their entirety.

BACKGROUND

Printing with edible ink on food products is done for purposes of identifying, marking, decorating or personalizing the food product. For example, food products such as cookies can be passed under a print head ejecting edible ink on the top surface of the cookie, whether iced or plain, can be printed with a selected design.

Currently, a conveyor belt system or tray is used where one or more cookies are spaced apart in an array on the conveyor belt or tray and passed below the print head of the printer. Alternatively, labels comprised of edible paper can be printed with edible ink and applied to a food item with an edible adhesive such as frosting or icing.

Systems of the prior art that are able to print images on an array of food products supported on a conveyor belt or a tray with two or more columns of food products requires a larger and more expensive printer on the scale of a commercial printer. Such systems also usually require sophisticated sensing systems to locate the position of each food item for printing.

Accuracy in image printing with edible ink on food products can be negatively affected by mist or excess ink ejected during the printing process which can settle anywhere in the printer, on surfaces, and/or on the printed surface.

SUMMARY

An aspect of the present disclosure relates to a printing system for printing images or content with edible ink on a surface of an edible food product. The edible food product printer of the present disclosure allows a user to print edible ink directly on food products at both low and higher volumes of food products.

Another aspect of the present disclosure relates to a spent printer ink collection system comprising a channel extending from a print area to a filtration system wherein the filtration system comprises one or more filters and wherein the channel is configured to direct airborne ink and mist generated during printing to the filtration system and wherein at least one of the channel and filtration system are removable from a printer for purposes of cleaning the ink collection system.

The channel comprises one or more side walls and the channel has an opening near the print area for entry of airborne ink and mist. The channel is configured to direct the airborne ink and mist from the print area to the filtration system. Air flow may be introduced into the channel to direct the airborne ink and mist to the filtration system.

The filtration system at least partially extends into the channel to collect airborne ink and mist directed into the channel from the print area.

Another aspect of the present disclosure relates to a printer having a system for collecting airborne ink mist from the printer. The printer has a print head movable within a print area, the print head configured to accept and dispense ink from one or more ink cartridges; a ink mist filtration system configured to capture at least one of airborne ink mist or ink droplets; and a channel extending from the print area to the ink mist filtration system and configured to direct the ink mist from the print area to the filtration system.

In one or more embodiments, the printer comprises a main printer body and a support base wherein the main printer body is positioned above the support base and a cavity is provided between the main printer body and the support base and wherein the print area is positioned within this cavity.

The one or more hinges secure the main printer body to the support base such that a hinged connection is provided for accessing the cavity.

The hinged connection allows for access to an interior area of the channel for cleaning collected ink mist from the channel or filtration system.

The channel directs airborne ink mist or unused ejected droplets of ink away from the print area and towards to the filtration system for collection.

In one or more embodiments, the printer has a receiving arm supported by the printer and extendable and retractable into the cavity and across a path of a print head of the printer to deliver substrates to the print area for printing and remove printed substrates from the print area.

In one or more embodiments, the filtration system comprises a filter and wherein the filter is removable for cleaning. The filter may be supported in a filter holder.

In one or more embodiments, the printer is configured for printing on a surface of one or more food products and wherein the food products are delivered and received within the cavity for printing thereon.

In one or more embodiments described herein, the substrate comprises a food product or edible element having a substantially flat surface, cookies, frosting sheets, rice paper, or combinations thereof.

Another aspect of the present disclosure relates to a method of collecting airborne ink mist from a printer. When printing content on a substrate with ink ejected from one or more ink cartridges carried by a print head, directing airborne ink mist generated during ejection of the ink and not deposited on the substrate away from a print area of the printer through a channel to a filtration system comprising one or more filters allows for collecting the airborne ink mist in a cleanable system rather than allowing the ink mist or spent droplets to collect or deposit on various interior surfaces and/or working components of the printer. Cleaning the collection system and removal of the ink mist includes accessing the channel and filtration system within the printer for cleaning the channel and filter after collection of ink mist.

Accessing the channel and filtration system includes opening the printer via a hinged connection between two portions of the printer wherein the channel and filtration system are housed within a cavity between the two portions of the printer.

BRIEF DESCRIPTION OF THE DRAWINGS

FIG. 2 is a perspective view of a food product printing system with a cover portion opened for exposing interior portions of a printer portion of the system.

FIG. 3 is a top perspective view of the food product printing system in an open position to expose the interior of the printing system.

FIG. 4 is a side view of an ink mist collection system within a printer.

FIG. 5 is a front perspective view of the ink mist collection system.

FIG. 6 is a front view of the ink mist collection system within a printer, with the housing and additional printer elements removed for illustration.

FIG. 7 is a top view of the food product printing system with food product for printing loaded thereon.

DETAILED DESCRIPTION

Figure 1:
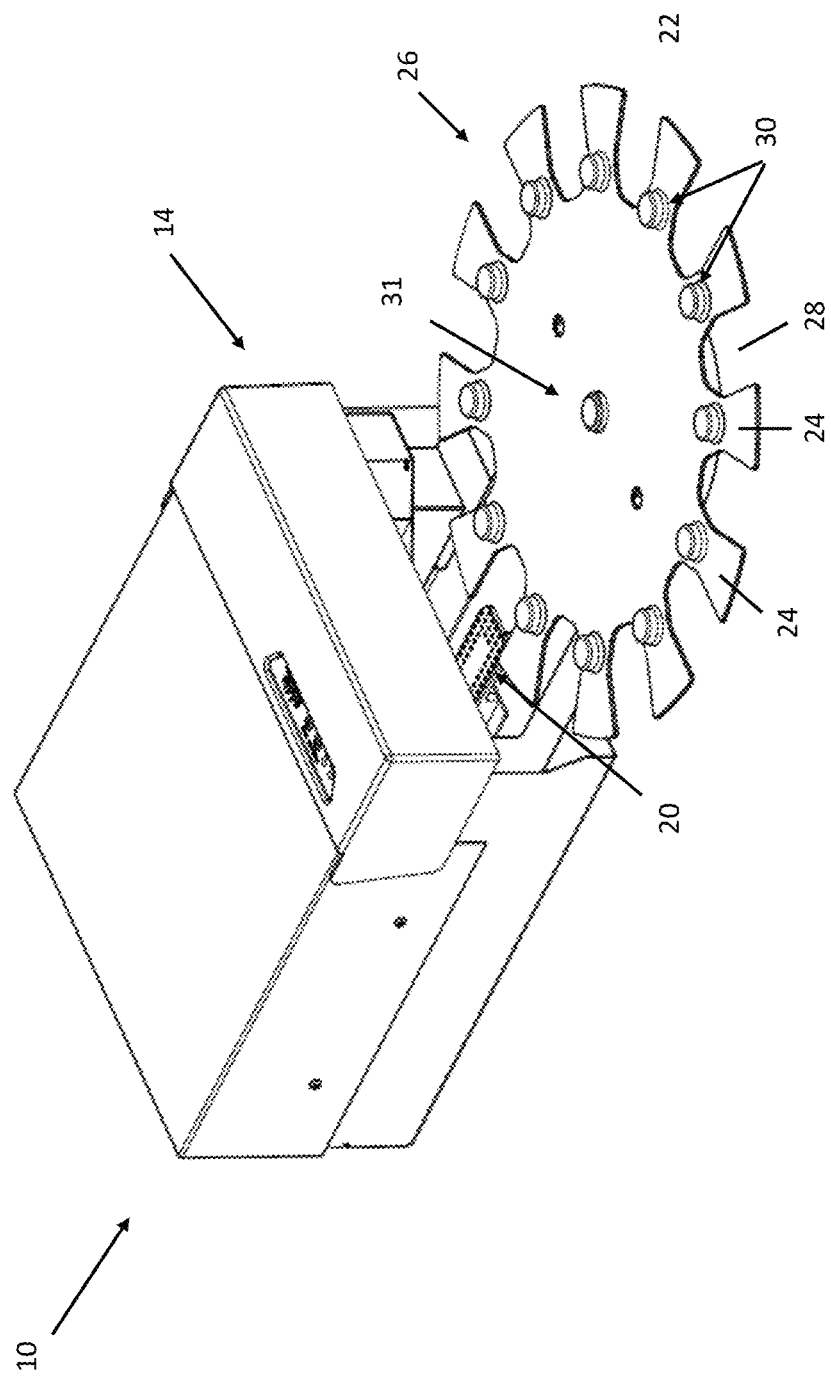
FIG. 1 is a perspective view of a food product printing system.

A food product printing system of the present disclosure includes a printer system for printing an image on a surface of the food product. The print surface may be an actual surface of the food product itself. The printer system comprises a printer having a receiving arm and a delivery tray supported on a base. The system may also be provided with a plurality of different delivery trays, each tray configured for continuous delivery of a varied number of food products, and/or for food products of different or specific dimensions.

The receiving arm is configured for receiving a food product from the delivery tray and moving the food product from the delivery tray into the printer and into a printing position. The printing position is substantially below a print head of the printer such that the surface to be printed on is in the path of the print head. Once the food product is printed, the receiving arm then returns the printed food product to the delivery tray. The delivery tray is also configured to move in one or more directions in order to continuously and automatically deliver a plurality of food items sequentially to the receiving arm.

The printer system is further configured with a ink mist collection system that pulls airborne ink mist generated during printing into a filtration system, thus preventing the ink mist or ink plume from accumulating elsewhere in the printer, or on objects in the surrounding environment. This includes airborne ink mist generated by ink droplets that bounce off the print surface of the food product and droplets that never make it to the print surface either because the droplets are not directed adequately toward the print surface, or a user intentionally printed beyond the food product (edge-to-edge printing). The ink mist collection system comprises a channel extending from a print area to the filtration system. The channel may provide a tunnel of sorts or otherwise provide sidewalls configured to direct airborne particles along the channel to the filtration system, which comprises one or more filters that are easily accessible and removable from the printing system for cleaning after collection. The channel allows the system to pull the airborne ink and mist generated during printing to the filtration system. Air flow may be directed into or through the channel in a manner that pushes, pulls, or otherwise directs the spent ink or airborne ink particles or ink mist from the print area to the filtration system.

In further detail, the ink mist collection system is illustrated at 100 in FIG. 4-6. While the ink mist collection system is described herein in connection with or otherwise incorporated into a printing system configured for printing on the surface of a food product as illustrated in FIGS. 1-3 and 7, such an ink mist collection system can be incorporated into any ink jet printing system or the like. As such, the embodiments described and illustrated here provide one illustrative example of an environment for the ink mist collection system and not considered to be limiting in any manner.

The ink mist collection system 100 utilizes a channel 110 which may be defined as having a base and side walls providing a length and a depth to the channel 110. The channel 110 leads from the print area to the filtration system 112 which comprises at least one filter 114. The system 100 may further include a directed air flow as illustrated by arrow 130 from the print area to or through the channel 110 and then to the filtration system 112 so as to encourage collection of the mist or other unused but ejected ink droplets by the filter 114. For example, a fan 116 may be provided to direct the airflow through the channel 110 and additionally or alternatively a negative airflow such as a vacuum may be provided near the filtration system 112 to pull the airflow through and along the channel 110.

The filter 114 is supported at or near a terminal end or side of the channel 110 and/or at least partially extending into the depth of the channel 110 at the terminal end of the channel 110. The filter 114 and channel 110 are positioned in a printing system 10 in a space adjacent to the print area in the printer system 10 as described in further detail below. For example, the channel 110 and filtration system 112 are positioned adjacent to or offset from print area 18 and behind or adjacent to an ink spray 118 generated during printing. The channel 110 initiates at or near the print area 18 and leads away therefrom so as not to interfere with the printing of products 12 in automatic succession.

In one embodiment, the filter 114 is supported by a filter holder 120 and is removable therefrom for replacement or cleaning. The filter 114 may be comprised of a porous foam material that can be easily cleaned for re-use or replaced after use. The filter holder 120 may be fixed to the printer system 10, fixed to the channel 110, or the filter holder 120 and channel 110 may be supported by a removable tray 122 which slides into the printer 14 at or in the print area 18.

The filter 114 is removably supported within the filter holder 120 and in a manner such that air flow through the filter 114 is allowed for collection of ink mist therein. The filter holder 120 may be a cage or other device not significantly obstructing the surface area of the filter 114 or impeding the ability of the filter 114 to catch or collect mist directed thereto.

Interior surfaces 126 of the channel 110 may further collect unused ink droplets or other ink debris directed away from the print area 18 and contacting the interior surfaces 126 of the channel 110 or otherwise not collected by the filter 114. As the channel 110 is removable from the printer 14, the channel 110 and filter 114 are thus removable for cleaning.

One or more of the channel 110 and the filter holder 120 may be comprised generally of a metal such as aluminum or stainless steel, but may alternatively or additionally comprise plastic materials. The channel 110 and/or filter holder 120 are easily cleanable by rinsing, wiping, washing or combinations thereof when accessed. The channel 110 is accessible in a printer system 10 wherein the printer comprises a main body and a support base that are removably or pivotally connected to one another, such that an interior cavity is accessible by way of opening the printer system 10 up. Once the interior cavity is exposed, the channel 110 and filtration system 112 are accessible for cleaning and/or removal.

In the embodiment illustrated, the channel 110 is a rectangular body having a length co-extending at least partially along a width or a depth of the printer system 10. The channel 110 extends a length away from the print area such that the filtration system 112 is spaced apart from or otherwise offset from the print area of print system 10.

In embodiments where the printer system 10 is configured as a hinged printing system 10 wherein an upper printer body 150 supporting the printing components such as the print head 14 is hingedly connected to a base portion 160, the channel 110 and filtration system 112 are connectable to the upper printer body 150 of the printer system 10 or the base portion 160 and are thus accessible when the printer system 10 is opened about the hinged connection 170 which pivotably connects the upper body 150 and the base portion 160. Food products enter the printer system 10 in a space 152 between the upper body 150 and the base portion 160 for printing. The channel 110 extends along and into this space 152 and is accessible from this space 152 when this space 152 is opened up by way of opening the printing system 10 about the hinged connection 170. In some embodiments the channel 110 may also be removable for cleaning.

One embodiment of the printing system 10 is illustrated generally in FIGS. 1-4. The printing system 10 is configured to receive a food product 12 from a delivery tray 22, to print on a surface of the food product 12 and return the food product 12 to the delivery tray 22. The system is also configured to do so automatically and continuously for a pre-determined number of food items. The system 10 comprises a printer 14 having a print head 16 and nozzles (not shown) wherein the print head 16 and nozzle are configured for printing with edible ink. The printer 14 also supports an extendable and retractable receiving arm 20.

The receiving arm 20 is operably connected to a power source within the printer 14. The receiving arm 20 is extendable and retractable with respect to the position of the path of the print head 16. The receiving arm 20 has a first end and a second opposing end and a substantially flat receiving surface extending therebetween. The first end is operably connected to a mechanism for retracting and extending the arm 20. The second end and at least a portion of the receiving surface of the receiving arm 20 are configured for extending outwardly from the printer 14. When extended, the receiving arm 20 may receive a food product, hold a food product, and/or return a printed food product to the delivery tray 22. The receiving arm also holds or supports the food product within the printer 14 and during printing on the surface of the food product 12.

With respect to the printer 14, the print head 16 moves linearly back and forth along a gantry in the manner of a standard inkjet printer for ejecting (edible) ink towards the print surface and thus printing pre-selected content on a print surface positioned below the path of the print head 16. The printer 14 is in communication with a controller (not shown) wherein software may be used to control printing of the content on one or a plurality of food products.

In further detail, the receiving arm 20 moves in a direction perpendicular to the print head path such that the receiving arm 20 extends and retracts across or through the path of the print head 16. In one embodiment, the receiving arm 20 is a substantially flat, rectangular support plate which extends towards a holder 26 of the delivery tray 22 in order to engage with and remove the food product 12 from the delivery tray 22 as well as to return printed food products to the delivery tray. A top surface of the receiving arm 20 is a receiving surface for food product and may be textured or otherwise provided with a surface to increase a co-efficient of friction between the receiving arm 20 and the food product for retaining the food product on the arm 20.

The receiving arm extends to receive or return the food product 12 and retracts from the tray 22 into the printer 14 and into a position below the print head 16 for printing. Once content is printed on a food product, the receiving arm 20 then extends to return the food product 12 back to the delivery tray 22. The delivery tray 22 then advances to provide a second unprinted food product 12 to the receiving arm 20. The receiving arm 20 is also configured for vertical movement such that the receiving surface of the receiving arm 20 is movable between two positions, a raised and a lowered position, where these positions allow the receiving arm 20 to retrieve and return food products 12 with respect to the delivery tray 22, and may allow for advancing of the delivery tray 22 when the receiving arm 20 is extended. Once loaded, the receiving arm 20 is then retracted to the printing position with the food product 12 thereon. This process continues on continuously and automatically per a pre-determined amount of food products are printed. It is also contemplated that the delivery tray may also be raised or lowered in order to allow for the delivery tray 22 to advance to a subsequent holder 26 or opening 28 on the delivery tray 22 for automatically delivering, receiving and thus printing on a plurality of food items.

As illustrated in FIGS. 4-5, positioned adjacent or near the printing system is a base 40 for providing power and controlling advancement and vertical positioning of the delivery tray 22.

Referring to FIGS. 5-6, the delivery tray 22 is a configured with a plurality of holders 26 as described in further detail below. Each holder 26 is configured to receive and support a food product 12 and deliver said food product 12 to the receiving arm 20. The delivery tray illustrated includes twelve (12) of holders 26, however, trays for holding fewer or more food products are contemplated and within the scope of this disclosure. The number of holders on a tray may be adjusted based on the type or size of item being printed.

In further detail, each holder 26 has two support sides 27 extending from a center 31 of the tray 22 and an opening 28 between these support sides 27. The food product is supported on the holder by way of resting on top of the two support sides 27 of the holder. The opening 28 between the sides 27 of the holder 26 is configured to receive the receiving arm 20 therein and allows for the receiving arm 20 to take a position for receiving and returning the food product to the delivery tray 22. That is, the receiving arm 20 can extend into this opening 28 and contact a bottom surface of the food product 12 that is supported on the sides 27 of each the holder 26. The receiving arm 20 then also supports the food product 12 thereon when retracting the food product 12 into the position for printing.

In the illustrated embodiment the food product is a dessert item such as a cookie. However, while examples of food items include various shapes, sizes, and types of cookies, the food items that can be printed with this system are not so limited. Frosting sheets, rice paper, bakery goods having at least one substantially flat surface for printing an image thereon, and other food items may be printed using this system. The delivery tray may be configured with positioning mechanisms which are tailored to the specific shape, size, thickness, type etc. of food product to be printed and thus, the system may be provided as a kit including the printer described herein including receiving arm and one or more delivery trays of various sizes, dimensions and for delivery of one or more different food products or food products having different dimensions.

The system is further configured with one or more control boards in communication with a computer or controller for configuring and initiating the printing process. However, the delivery tray is configured with one or more positioning mechanisms such that in combination with the receiving arm as a food product is delivered to the printer and positioned below the print head, the need for a sensing system or series of sensors for detecting the position of the food product is eliminated. A sensor may be utilizing in the printer for confirming the presence of the food product in the printer for printing. The sensors may be positioned on the print head and used to detect only the presence of the substrate for printing. The system is a fixed spot printing system so there is no need for scanning for position of the print surface. The system also allows for loading of unprinted food products and unloading of printed food products during printing or otherwise "on the fly." The control board or boards allow for the delivery of a first food product, printing of the first food product, return of the first food product, advancing of the delivery tray to provide a second food product for delivery, delivery of the second food product, printing of the second food product, return of the second food product to the delivery tray and advancing for delivery of one or more subsequent food products for printing and return. Thus, the system allows for the automatic delivery, printing on and return of a plurality of food products.

Although the present disclosure has been described with reference to preferred embodiments, workers skilled in the art will recognize that changes may be made in form and detail without departing from the spirit and scope of the disclosure.

The invention claimed is:

1. A printer ink mist collection system comprising:
a channel extending along a printer body and adjacent to a print area of the printer, to a filtration system wherein the filtration system comprises one or more filters and wherein the channel is configured to direct airborne ink and mist generated during printing from the print area to the filtration system, wherein the channel and filtration system are removable from within a printer housing for purposes of cleaning the ink collection system, and wherein the print area is positioned within a length of the channel spaced apart from the filtration system such that printing occurs within at least a portion of the channel, and wherein the channel, filtration system and print area are positioned within the printer body.

2. The system of claim 1, wherein the filtration system comprises a filter that is removably supported in a filter holder.

3. The system of claim 1 wherein the channel comprises a tray having one or more side walls and wherein the channel has an opening near the print area for entry of airborne ink and mist.

4. The system of claim 1 and further comprising a fan for directing an airflow through the print area or ink spray and into the channel.

5. The system of claim 1 wherein the channel is constructed of a metal and is cleanable for reuse.

6. A printer having a system for collecting airborne ink mist from the printer, the printer comprising:
a print head movable within a print area, the print head configured to accept and dispense ink from one or more ink cartridges;
an ink mist filtration system configured to capture at least one of airborne ink mist or ink droplets; and
a channel spaced apart from the print head and extending from the print area to the ink mist filtration system, the print area positioned within at least a portion of the channel and the channel configured to direct the ink mist generated while the print head is within the print area from the print area to the filtration system.

7. The printer of claim 6 wherein the printer comprises a main printer body and a support base wherein the main printer body is positioned above the support base and a cavity is provided between the main printer body and the support base and wherein the print area is positioned within this cavity and the channel extends along this cavity and is provided on the support base.

8. The printer of claim 7 wherein one or more hinges secure the main printer body to the support base such that a hinged connection is provided for accessing the cavity.

9. The printer of claim 8 wherein the hinged connection allows for access to an interior area of the channel for cleaning collected ink mist from the channel or filtration system.

10. The printer of claim 7 and further comprising:
a receiving arm supported by the printer and extendable and retractable into the cavity and across a path of a print head of the printer to deliver substrates to the print area for printing and remove printed substrates from the print area.

11. The printer of claim 10 wherein the substate comprises a food product or edible element having a substantially flat surface, cookies, frosting sheets, rice paper, or combinations thereof.

12. The printer of claim 10 and further comprising a fan for directing air flow.

13. The printer of claim 6 wherein the filtration system comprises a filter and wherein the filter is removable from a filter holder for cleaning.

14. The printer of claim 6 wherein the channel directs airborne ink mist or unused ejected droplets of ink away from the print area and towards to the filtration system for collection.

15. The printer of claim 6 wherein the printer is configured for printing on a surface of one or more food products and wherein the food products are delivered and received within the cavity for printing thereon.

16. A method of collecting airborne ink mist from a printer, the method comprising:
printing content on a substrate with ink ejected from one or more ink cartridges carried by a print head when the substrate is positioned at least partially within a channel;
directing airborne ink mist generated during ejection of the ink and not deposited on the substrate away from a print area of the printer through the channel positioned within the printer, spaced apart and adjacent to the print head to a filtration system comprising one or more filters; and
accessing the channel and filtration system within the printer for cleaning the channel and filter after collection of ink mist.

17. The method of claim 16 wherein accessing the channel and filtration system comprises opening the printer via a hinged connection between two portions of the printer wherein the channel and filtration system are housed within a cavity between the two portions of the printer.

18. The method of claim 16 wherein the substate comprises a food product or edible element having a substantially flat surface, cookies, frosting sheets, rice paper, or combinations thereof.

* * * * *